United States Patent [19]
Bianchi

[11] 4,437,486
[45] Mar. 20, 1984

[54] LINE REMOVABLE VALVE STRUCTURE WITH PIPELINE SUPPORT MEANS

[75] Inventor: Giuseppe Bianchi, Cava Manara, Italy

[73] Assignee: Grove Valve and Regulator Company, Oakland, Calif.

[21] Appl. No.: 366,682

[22] Filed: Apr. 8, 1982

[30] Foreign Application Priority Data

Jan. 28, 1982 [EP] European Pat. Off. ............ 82830018

[51] Int. Cl.³ .............................................. F16K 51/00
[52] U.S. Cl. .................................. 137/315; 137/454.2; 251/151; 251/152; 285/18; 285/325
[58] Field of Search ............................. 137/315, 454.2; 251/148, 151, 152; 285/18, 24, 17, 27, 325

[56] References Cited

U.S. PATENT DOCUMENTS

| | | | |
|---|---|---|---|
| 2,955,850 | 10/1960 | Bellinger | 285/18 |
| 3,672,632 | 6/1972 | Chow | 137/454.2 X |
| 4,198,076 | 4/1980 | Mezei | 285/18 |
| 4,311,163 | 1/1982 | Langevin | 137/315 |
| 4,387,735 | 6/1983 | Ripert | 137/315 |

Primary Examiner—Martin P. Schwadron
Assistant Examiner—Stephen M. Hepperle
Attorney, Agent, or Firm—Melvin R. Stidham

[57] ABSTRACT

A line-removable valve structure comprising a pipeline-supporting cage and a cartridge containing the working valve components. The cage comprises a pair of thick steel end plates connected by studs and a balanced array of hydraulic rams. With nuts on the studs loosened, the rams can force the end plates apart for removal of the valve cartridge. Sliding guide means are provided to enable such axial movement of the end plates but to prevent relative radial movement thereof, thus maintaining the integrity of the pipeline.

6 Claims, 3 Drawing Figures

LINE REMOVABLE VALVE STRUCTURE WITH PIPELINE SUPPORT MEANS

BACKGROUND OF THE INVENTION

Particularly in undersea pipeline installations, it is highly desirable to be able to remove a pipeline valve, or its internal components for purposes of repairing and replacing same while continuing to support the pipeline during the removal and replacement operation.

Some have suggested the provision of top-entry valves wherein access to the valve internal components is gained by removal of a top closure. However, the repair of such valves requires a number of mechanical manipulations such as the removal and replacement of bolts, the main valve member and the seat ring assemblies, and such operations are not ideally performed on the ocean floor, where maneuverability and mechanical leverage are impaired and visibility is generally poor. Moreover, a part dropped in the silt and vegetation of the ocean floor may not be easily found.

There are commercially available valves of the expansible tube type, wherein a cartridge containing all of the operating parts of the valve is clamped between two line flanges which, in turn, are interconnected by threaded studs. In order to remove the cartridge from between the line flanges, the studs across the top are removed and the nuts on the remaining studs are loosened. Jacking nuts are provided on at least some of the remaining studs on the inboard side of the flanges so that they can be threaded outward to jack the line flanges apart for removal of the valve cartridge. However, in undersea operations, the seas, tides and shifting sands impose many additional forces on the pipeline which, with the removal of studs between the line flanges could impose severe stresses on the remaining studs and prevent proper realignment when the valve cartridge is replaced. Moreover, the studs and nuts removed from the valve for purposes of valve cartridge replacement, are easily lost in the silt, sands and vegetation on the ocean floor where visibility is something less than ideal.

OBJECTS OF THE INVENTION

It is an object of this invention to provide a pipeline valve, the principal components of which may be removed from the line while other members continue to support and maintain the integrity of the pipeline.

It is a further object of this invention to provide a removable ball valve for undersea service which can be removed and replaced in a minimum amount of time with a minimum number of tools.

It is a further object of this invention to provide an undersea pipeline valve wherein a valve cartridge can be removed without requiring removal of nuts, bolts or the like.

It is a further object of this invention to provide an undersea pipeline valve which can be removed from the line while the adjacent pipeline sections are held in alignment.

Other objects and advantages of this invention will become apparent from the description to follow, particularly when read in conjunction with the accompanying drawings.

SUMMARY OF THE INVENTION

The valve cartridge comprises a cylindrical body containing the main valve closure and seal rings, and end plates are secured to the body by countersunk cap screws. The cartridge is received in a cage comprising two parallel, opposing thick steel plates secured together by studs, and seals are provided between each end plate of the valve cartridge and the adjacent one of the parallel plates. The parallel plates are supported in a structure that enables them to be separated axially while holding them firmly against any radial movement that might cause misalignment. With the nuts loosened on the studs, hydraulic rams interconnecting the steel plates may be extended to separate them slightly for removal of the valve cartridge from between them.

DESCRIPTION OF PREFERRED EMBODIMENTS

Figure 1:
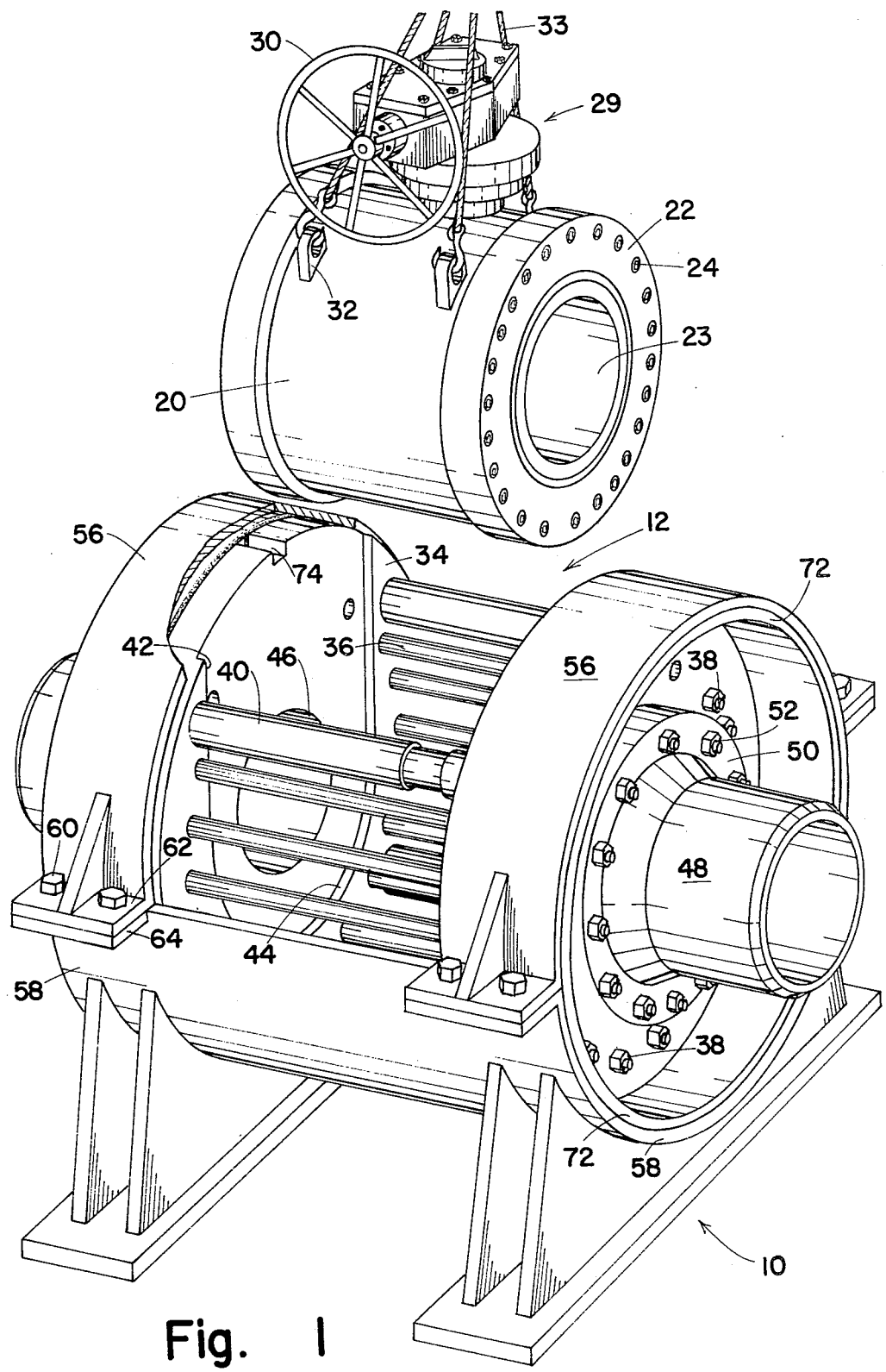
FIG. 1 is a view in perspective showing the mounting cage with the valve cartridge removed and suspended above it.
Figure 2:
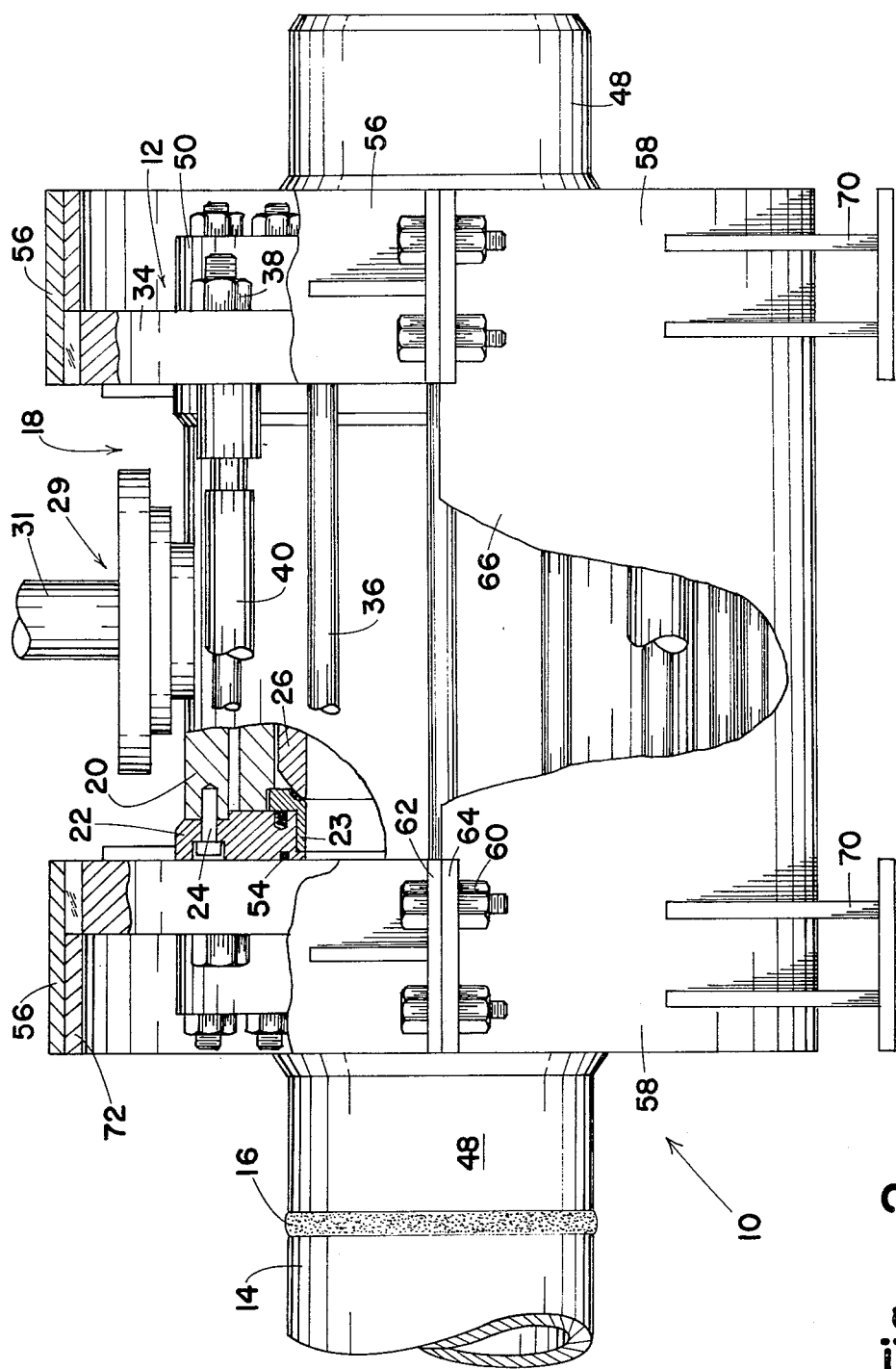
FIG. 2 is an elevation view partially in section, of the complete valve assembly.

The Embodiment of FIGS. 1 and 2

Referring now to the drawings with greater particularity, the undersea pipeline valve assembly 10 of this invention includes a cage-like structure 12, which is permanently secured to the underwater pipeline 14 (FIG. 2) as by means of welds 16, and the valve cartridge 18. The valve cartridge includes a cylindrical valve body 20, and steel plate end closures 22 with flow passageways 23 therethrough, which are secured to the body 20, as by means of countersunk cap screws 24. Also included in the valve cartridge is the main valve closure member 26 such as a rotatable ball or plug and suitable seat ring assemblies 28 for sealing between the valve body 20 and the valve closure member 26. Any suitable valve operating means such as a scotch yoke operator 29 with a hand wheel 30, may be mounted on the stem 31 for opening and closing the valve. Lifting lugs 32 may also be provided on the valve cartridge 18 for attachment of suitable lifting cables 33.

The cage 12 comprises a pair of parallel, thick circular steel plates 34 which are secured together by circumferential row of threaded studs 36. The studs are threaded at at least one end to receive nuts 38 and the thick steel plates 34 are also interconnected by hydraulic rams 40. When the nuts 38 are loosened, the rams 40 may be extended to move the steel plates 34 apart a short distance, enabling removal of the cartridge 18. The inner surfaces of the parallel plates 34 may be machined at 42 to provide slideways for the cartridge 18 with arcuate bottom seating surfaces 44.

The parallel steel plates 34 are also provided with circular flow openings 46 and hubs or other suitable pipe joint connection means 48 are secured around the flow opening 46 as by means of a flange 50 which is bolted to the end plates at 52.

Referring specifically to FIG. 2, the valve capsule or cartridge 18 includes all the necessary working components of the valve, including a cylindrical body 20 and thick steel plate end closures 22 with flow passageways 23 therethrough, the end closures being secured to the body 20, as by means of cap screws 24. Countersunk recesses are provided in the end plates 22 so that the cap screw heads are wholly contained, leaving the outer surface of the end closures free. A seal ring such as an O-ring 54, is provided on the outboard side of each end closure 22 around and concentric with the flow passageway 23 so that, when the nuts 38 are tightened on the studs 36 the O-ring 54 seals against the inner face of the thick steel plates 34 to provide a fluid tight structure.

The circular parallel plates 34 are received in complementary two-piece circular collars 56 and 58 which are secured together by bolts 60 at complementary connector radial extensions 62 and 64.

The collars 58 are interconnected by an integral semi-cylindrical support or brace 66 to which are welded suitable foundation members 70. Hence, even with the cartridge 18 and some of the studs 36 removed, the parallel pipeline support plates 34 are firmly retained in the fixed, axially aligned collars 56, 58 so that the pipeline integrity is maintained until the valve catridge and studs 36 can be replaced.

If desired, a sleeve extension 72 may be welded to the parallel end plates 34 to increase the surface bearing area with the collars 56, 58, and a keyway 74 (FIG. 1) may be provided to prevent relative rotational movement of the circular parallel plates 34 and the collars 56, 58.

Figure 3:
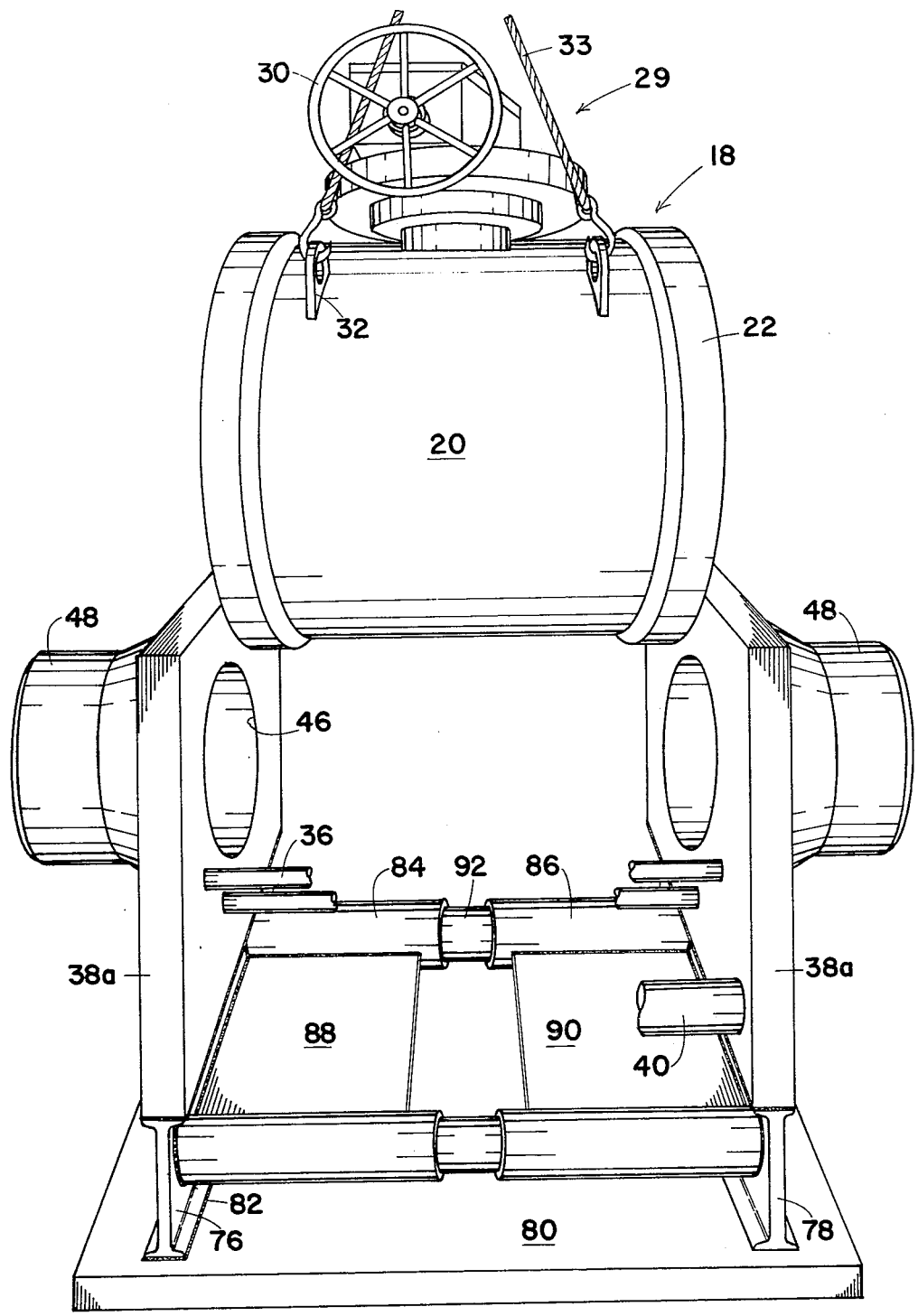
FIG. 3 is a view in perspective of another pipeline support embodiment.

The Embodiment of FIG. 3

Here, the parallel thick end plates 38a may be of square or rectangular configuration though still interconnected by studs 36 and hydraulic rams 40. In this embodiment however, the foundation members 76 may take the form of I-beams which are relatively slidable on a suitable base 80 for separation of the parallel end plates 38a for removal and replacement of the valve cartridge 18, as previously described. Where a base plate 80 is provided to facilitate sliding, one of the foundation members 76 may be welded to the base member at 82. In this embodiment, the guide members take the form of two pairs of parallel cylinders 84 and 86 which may be rigidly interconnected by steel plates 88 and 90 to further rigidify the structure. Slidably carried in at least one pair of the cylinders are plungers 92 along which the cylinders 84, 86 are guided to maintain axial alignment of the end plate hubs 48. Of course it should be understood that the plungers 92 may be welded or otherwise secured to one of the cylinders 84 or 86, as along as it is free to slide in the other to enable the necessary axial movement of the parallel end plates 38a. Also, it is to be understood that the cylinders 84 and 86, or at least one of them which receives the sliding plunger 92, is vented to prevent any hydraulic lock.

While this invention has been described in conjunction with a preferred embodiment thereof, it is obvious that modifications and changes therein may be made by those skilled in the art to which it pertains, without departing from the spirit and scope of this invention as defined by the claims appended hereto.

What is claimed as invention is:

1. A line-removable valve structure comprising: a pipeline-supporting cage and a valve cartridge; said cage comprising:
   a pair of parallel, thick steel end plates with flow passages therethrough;
   a series of studs interconnecting said end plates;
   a nut threaded onto at least one end of each of said studs;
   hub members carried on the outboard sides of said end plates around said flow passages for installing said cage into a pipeline; and
   linear, hydraulic ram force-applying members connected between said end plates for selected limited separation thereof upon loosening of said threaded nuts;
   said valve cartridge comprising:
   a valve body with flow passages therethrough and a movable valve closure member for blocking and unblocking said flow passages;
   said valve body being receivable between said thick end steel plates; and
   seals rings for sealing between the ends of said valve body and said end plates around said flow passages; and
   said valve structure including:
   separate telescoping, cylindrical guide means axially extending between said end plates so as to enable limited relative axial movement of said end plates and preventing relative radial movement thereof.

2. The line-removable valve structure defined by claim 1 wherein said guide means comprises:
   a tubular cylinder rigidly secured to one of said end plates; and
   a plunger rigidly secured to the other of said end plates and slidably carried in said cylinder.

3. The line-removable valve structure defined by claim 1 wherein said guide means comprises:
   a pair of tubular cylinders rigidly secured to one of said end plates adjacent the sides thereof;
   a pair of plungers rigidly secured to the other of said end plates and slidably carried in said cylinder;
   a first pair of steel plates extending between and welded to said pair of cylinders; and
   a second pair of steel plates extending between and welded to said pair of plungers.

4. The line-removable valve-structure defined by claim 3 wherein:
   said cylinders are open at both ends to enable free movement thereof.

5. The line-removable valve structure defined by claim 1 wherein said guide means comprises:
   a pair of collars, each slidably receiving one of said end plates; and
   rigid reinforcing means fixed to and interconnecting said pair of collars.

6. The line-removable valve structure defined by claim 5 wherein:
   said end plates are of circular configuration and said collars are annular; and
   said reinforcing means comprises an arcuate plate welded to and between said collars.

* * * * *